Sept. 14, 1965     L. KRAMER     3,205,986
OVERLOAD RELEASE CLUTCH WITH FLUID LOCKOUT
Filed April 21, 1964
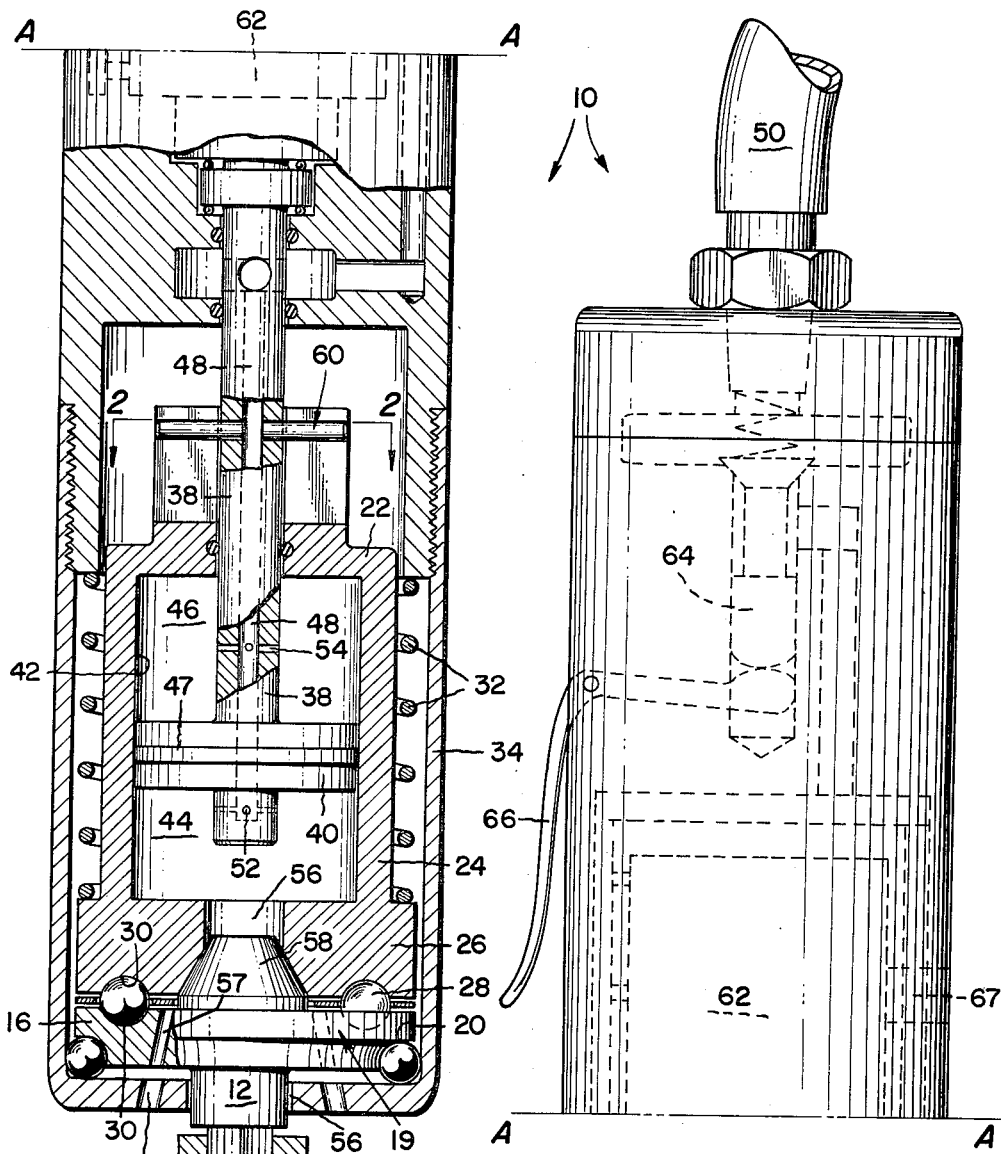
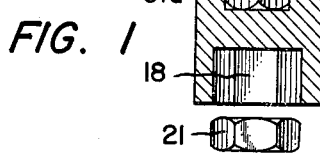
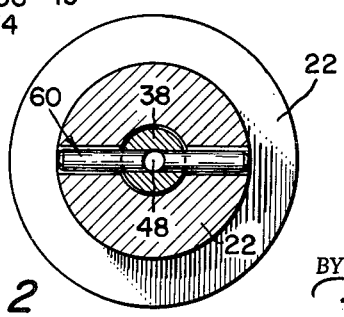
INVENTOR.
LEO KRAMER
BY
ATTORNEY

United States Patent Office 3,205,986
Patented Sept. 14, 1965

3,205,986
OVERLOAD RELEASE CLUTCH WITH FLUID LOCKOUT
Leo Kramer, Chester, N.J., assignor to Ingersoll-Rand Company, New York, N.Y., a corporation of New Jersey
Filed Apr. 21, 1964, Ser. No. 361,385
8 Claims. (Cl. 192—56)

This invention relates to clutches and more particularly to a fluid operated "one shot" clutch.

Heretofore, most "one shot" clutch devices employed a strictly mehanical lock-out mechanism which is a complex mechanism involving a large number of parts that are subject to constant wear. Further a mechanical lock-out mechanism requires considerable motion after a fastener has been screwed in place, before the mechanism locks out thus considerably adding to the wear. Finally, the interengaging clutch jaw members are a further source of great wear.

It is the general object of the present invention to avoid and overcome the foregoing and other difficulties of and objections to prior art practices by the provision of a simple fluid operated lock-out mechanism having few parts.

Another object of the present invention is to reduce wear in the lock-out mechanism.

Still another object of the present invention is to attain immediate lock-out thus eliminating considerable motion before lock-out.

Yet another object of the present invention is to achieve immediate uncoupling at the instant of slight separation of the clutch jaws.

The aforesaid objects of the present invention, and other objects which will become apparent as the description proceeds, are achieved by providing an improved one shot clutch for driving a nut. The improved one shot clutch has a spindle for driving the nut. A drive means is connected to the spindle to drive the spindle. In addition a control means is provided for disconnecting the drive means for the spindle upon a predetermined torque resistance from the nut.

For a better understanding of the present invention reference should be had to the accompanying drawings, wherein like numerals of reference indicate similar parts throughout the several views and wherein:

FIG. 1 is a longitudinal sectional view partly schematic illustrating a preferred embodiment of the invention;

FIG. 1a is a continuation of FIG. 1 from the line a–a of FIG. 1 illustrating the fluid supply connections to the embodiment shown in FIG. 1;

FIG. 2 is a sectional view along the lines 2—2 of FIG. 1 taken in the direction of the arrows.

Although the principles of the present invention are broadly applicable to clutches in general, the present invention is particularly adapted for use in conjunction with one shot clutches and hence it has been so illustrated and will be so described.

With specific reference to the form of the present invention illustrated in the drawings, and referring particularly to FIG. 1, a one shot clutch is indicated generally by the reference numeral 10. The one shot clutch 10 has a spindle 12. The spindle 12 has a driving end 14 and a driven end 16. The driving end 14 is provided with a recess 18 which recess 18 is constructed and arranged to receive a nut 21 in a driving engagement. The spindle 12 is driven by a drive means, such as a drive assembly 19. The drive assembly 19 has a clutch jaw 20 disposed on the driven end 16 of the spindle 12. In order to rotatably drive the spindle 12 the drive assembly is provided with a cylinder 22. The cylinder 22 has at one end 24 a clutch jaw 26 which clutch jaw 26 is aligned opposite the clutch jaw 20. Cam means, such as for example, cam teeth (not shown) or a set of balls 28 resting in recesses 30 located in the clutch jaws 20 and 26, complete the driving connection betwen the housing 22 and the spindle 12. A spring 32 is disposed around the cylinder 22 and compressed between the clutch jaw 26 and the casing 34 to constantly urge the cylinder 22 against the jaw 20.

The cylinder 22 receives in part a drive shaft 38 as shown in FIG. 1. A piston 40 is disposed on the drive shaft 38 and cooperates with the walls 42 of the cylinder 22 to divide the cylinder 22 into two pressure chambers 44 and 46, which pressure chambers 44 and 46 form a control means for disconnecting the drive assembly 19 from the spindle 12 upon a predetermined torque resistance from the nut 21. Seal means, such as a ring seal 47, on the piston 40 provides a fluid tight partition between the chambers 44 and 46 in the cylinder 22.

In order to supply fluid under pressure to the chambers 44 and 46, a conduit 48 is disposed in the drive shaft 38. The conduit 48 is connected to an external pressure fluid supply source 50 (such as a compressor or a pump, not shown) and is provided with orifices 52 and 54 through which orifices 52 and 54 the fluid is introduced into the chambers 44 and 46 respectively. In order to exhaust the fluid from the chamber 44, the chamber 44 is provided with an exhaust port 56. The exhaust port 56 is normally kept closed by the action of the spring 32 forcing the cylinder 22 and the exhaust port 56 against a conical portion 58 of the spindle 12.

The drive shaft 38 is slidably fixed to the cylinder 22 by key means, such as a sliding key assembly 60, which permits the cylinder 22 to slide along the longitudinal axis of the drive shaft 38. A standard motor, such as a fluid motor 62 is provided to rotatably drive the drive shaft 38. For the sake of simplicity one hand operated control valve 64 and lever 66 can be provided to control the fluid supply from the fluid source 50 to the fluid motor 62 and to the conduit 48.

It will now be understood that the spring 32 will constantly urge the cylinder 22 and the exhaust port 56 against the conical portion 58 of the spindle 12, to form a fluid tight seal therewith. The fluid tight seal between the spindle 12 and the cylinder 22 and between the piston 40 and the cylinder 22 will serve to keep the chambers 44 and 46 under equal pressure when the chambers 44 and 46 are supplied with fluid under pressure through the orifices 52 and 54 respectively.

It will further be understood that the drive shaft 38 through the key assembly 60 rotate the cylinder 22 which cylinder 22 in turn through the cam means 28 and the jaws 26 and 20 drives the spindle 12. When the nut 21 is driven in place by the spindle 12, the nut 21 will resist the turning action of the spindle 12. The cylinder 22, however, will continue to be rotated by the drive shaft 38, thus causing the jaw 26 to ride on the balls 28. The balls 28 will then be forced to roll out of their sockets 30. The balls 28 in rolling out of their sockets 30 will force the cylinder 22 to move against the compressive force of the spring 32 and to slide away from the spindle 12.

As the cylinder 22 slides away from the spindle 12, the exhaust port 56 will move away from the conical portion 58 of the spindle 12 and thus the exhaust port 56 will be slightly opened. The opening of the exhaust port 56 will result in the exhausting of the fluid from the pressure chamber 44 through the conduits 57 and 57a located in the clutch jaw 20 and the housing 34 respectively. The pressure chamber 46 will remain under pressure thus resulting in the unbalancing of the pressure forces between the chambers 44 and 46. The difference in pressure between the chambers 44 and 46 will cause the pressurized air in the chamber 46 to expand thus forcing the cylinder 22 to spontaneously slide away from the spindle 12 to fully disengage the driving connection between the cylinder 22 and the spindle 12. The operator then releases the trigger 66 on the control valve 64 to cut-off the fluid supply to the fluid motor 62 and the conduit 48. The releasing of the trigger 66 also allows the fluid in the chamber 46 to flow backward out of the conduit 48 and be exhausted through the motor exhaust 67. When the fluid in the chamber 46 is exhausted, the pressure forces in the chamber 46 will drop below the compressive force exerted by the spring 32 on the cylinder 22 which point the spring 32 will push the cylinder 22 back against the spindle 12 to set the one shot clutch 10 in position for another operation.

It will be recognized by those skilled in the art that the objects of the present invention have been achieved by providing a simple fluid operated lock-out mechanism with few parts, that would attain immediate lock-out at the moment of slight separation of the clutch jaws thus reducing undue and excessive wear.

While in accordance with the patent statutes a preferred embodiment of the present invention has been illustrated and described in detail, it is to be particularly understood that the invention is not limited thereto or thereby.

I claim:

1. In a rotary tool having a motor, a driveshaft driven by said motor, a spindle adapted to be driven by said driveshaft, and a torque-responsive clutch including two engageable clutch jaws interconnecting said driveshaft and said spindle for transmitting a torque load from said driveshaft to said spindle and being axially movable relative to each other to disengage said driveshaft from said spindle in response to the torque load rising to a predetermined torque load, the combination comprising:
   (a) clutch disengaging means including a cylinder element and a piston element slidably contained in said cylinder element;
   (b) said piston element dividing said cylinder element into two substantially closed pressure chambers;
   (c) one of said elements being connected to one of said clutch jaws;
   (d) the other element being anchored against axial movement relative to said one clutch jaw;
   (e) a conduit to supply pressure fluid to each of said chambers to create an equal pressure in both of said chambers;
   (f) and vent means connected to said clutch jaws to exhaust one of said chambers in response to the initial disengagement of said clutch jaws after reaching said predetermined torque load to create a pressure differential between said chambers;
   (g) said pressure differential acting in a direction causing said one clutch jaw to be entirely disengaged from the other of said clutch jaws.

2. The combination of claim 1 wherein said conduit includes a restricted port opening into said one pressure chamber whereby the exhausting of said one pressure chamber does not substantially reduce the pressure in said conduit.

3. The combination of claim 2 wherein said conduit includes another restricted port opening into said other pressure chamber.

4. The combination of claim 1 including biasing means normally urging said clutch jaws into engagement.

5. A one shot clutch for driving a nut comprising:
   (a) a spindle for driving said nut;
   (b) a cylinder disposed adjacent said spindle;
   (c) a drive shaft disposed in part in and drivingly connected to said cylinder;
   (d) a piston disposed on said drive shaft in said cylinder;
   (e) said piston cooperating with the walls of said cylinder to form two pressure chambers;
   (f) each of said pressure chambers being provided with fluid under pressure from an external source;
   (g) means for transmitting driving torque from said cylinder to said spindle;
   (h) an exhaust port for one of said chambers disposed on said cylinder opposite said spindle;
   (i) said exhaust port being normally closed by said cylinder resting against said spindle; and
   (j) means on said jaws for pushing said cylinder away from said spindle upon a predetermined torque resistance from said nut to open said exhaust port to cause said cylinder to slide along said drive shaft away from said spindle to break the driving connection between said cylinder and said spindle.

6. A one shot clutch for driving a nut comprising:
   (a) a spindle for driving said nut;
   (b) a cylinder disposed adjacent said spindle;
   (c) a drive shaft disposed in part in said cylinder;
   (d) a piston disposed on said drive shaft in said cylinder;
   (e) said piston cooperating with the walls of said cylinder to form two pressure chambers;
   (f) each of said pressure chambers being provided with fluid under pressure from an external source;
   (g) a sliding key disposed on said cylinder and said drive shaft to transmit torque from said drive shaft to said cylinder and to allow sliding motion between said drive shaft and said cylinder;
   (h) a first clutch jaw disposed on said cylinder;
   (i) a second clutch jaw disposed on said spindle opposite said cylinder clutch jaw;
   (j) an exhaust port for one of said chambers disposed on said cylinder jaw opposite said spindle;
   (k) said exhaust port being normally closed by said cylinder jaw resting against said spindle jaw; and
   (l) means on said jaws for pushing said cylinder away from said spindle upon a predetermined torque resistance from said nut to open said exahust port to cause said cylinder to slide along said drive shaft away from said spindle to break the driving connection between the jaws.

7. A one shot clutch for driving a nut comprising:
   (a) a spindle for driving said nut;
   (b) a cylinder disposed adjacent said spindle;
   (c) a drive shaft disposed in part in said cylinder;
   (d) a piston disposed on said drive shaft in said cylinder;
   (e) said piston cooperating with the walls of said cylinder to form two pressure chambers;
   (f) each of said pressure chambers being provided with fluid under pressure from an external source;
   (g) a sliding key disposed on said cylinder and said drive shaft to transmit torque from said drive shaft to said cylinder and to allow sliding motion between said drive shaft and said cylinder;
   (h) a first clutch jaw disposed on said cylinder;
   (i) a second clutch jaw disposed on said spindle opposite said cylinder clutch jaw;
   (j) biasing means disposed on said cylinder for urging said cylinder jaw against said spindle jaw to drive said spindle;
   (k) an exhaust port for one of said chambers disposed on said cylinder jaw opposite said spindle;
   (l) said exhaust port being normally closed by said cylinder jaw resting against said spindle jaw; and
   (m) means on said jaws for pushing said cylinder away from said spindle upon a predetermined torque resistance from said nut to open said cylinder to slide along said drive shaft away from said spindle to break the driving connection between the jaws.

8. A one shot clutch for driving a nut comprising:
   (a) a spindle for driving said nut;
   (b) a cylinder disposed adjacent said spindle;
   (c) a drive shaft disposed in part in said cylinder;
   (d) a piston disposed on said drive shaft in said cylinder;

(e) said piston cooperating with the walls of said cylinder to form two pressure chambers;
(f) each of said pressure chambers being provided with fluid under pressure from an external source;
(g) a sliding key disposed on said cylinder and said drive shaft to transmit torque fram said drive shaft to said cylinder and to allow sliding motion between said drive shaft and said cylinder;
(h) a first clutch jaw disposed on said cylinder;
(i) a second clutch jaw disposed on said spindle opposite said cylinder clutch jaw;
(j) biasing means disposed on said cylinder for urging said cylinder jaw against said spindle jaw to drive said spindle;
(k) an exhaust port for one of said chambers disposed on said cylinder jaw opposite said spindle;
(l) said exhaust port being normally closed by said cylinder jaw resting against said spindle jaw; and
(m) means on said jaws for pushing said cylinder away from said spindle upon a predetermined torque resistance from said nut to open said exhaust port to cause a pressure differential between said chambers to cause said cylinder to slide along said drive shaft away from said spindle to break the driving connection between the jaws.

References Cited by the Examiner
UNITED STATES PATENTS

| | | | |
|---|---|---|---|
| 1,919,437 | 7/33 | Le Fevre | 192—56 |
| 2,683,512 | 7/54 | Boice | 192—56 |

DAVID J. WILLIAMOWSKY, *Primary Examiner.*